US005403431A

United States Patent [19]

Goto

[11] Patent Number: 5,403,431

[45] Date of Patent: Apr. 4, 1995

[54] LABEL FEED PITCH CHANGE-OVER MECHANISM FOR LABELER

[75] Inventor: Fumio Goto, Iwate, Japan

[73] Assignee: Kabushiki Kaisha Sato, Tokyo, Japan

[21] Appl. No.: 133,624

[22] Filed: Oct. 8, 1993

[30] Foreign Application Priority Data

Oct. 8, 1992 [JP] Japan .............................. 4-075906 U

[51] Int. Cl.[6] .............................................. B32B 31/00

[52] U.S. Cl. .................................... 156/540; 156/542; 156/577; 156/579

[58] Field of Search ............... 156/384, 540, 541, 542, 156/566, 579, 584, 577

[56] References Cited

U.S. PATENT DOCUMENTS 4,270,968 6/1981 Dudzik et al. .................. 156/542 X
4,479,839 10/1984 Tasma ............................ 156/542 X
4,585,506 4/1986 Matsugushi ..................... 156/542 X
4,986,874 1/1991 Kawada .......................... 156/579 X
5,236,535 8/1993 Smith ............................. 156/540 X

*Primary Examiner*—David A. Simmons
*Assistant Examiner*—James J. Engel
*Attorney, Agent, or Firm*—Ostrolenk, Faber, Gerb & Soffen

[57] ABSTRACT

A label feed pitch change-over mechanism for a labeler comprising a pitch change-over section equipped with stops and disposed at the bottom of the labeler to be slidable in the longitudinal direction thereof. A claw reciprocator for engaging the backing strip of a continuous label strip and drawing the continuous label strip from a roll. Gears mechanically linked with a hand-operated lever for driving the claw reciprocator. The gears are provided with cams engageable with the stops. The label feed pitch of the claw reciprocator can be shifted between short and long pitch states by sliding the pitch change-over section to bring the stops into or out of engagement with the cams.

4 Claims, 10 Drawing Sheets

FIG. 8
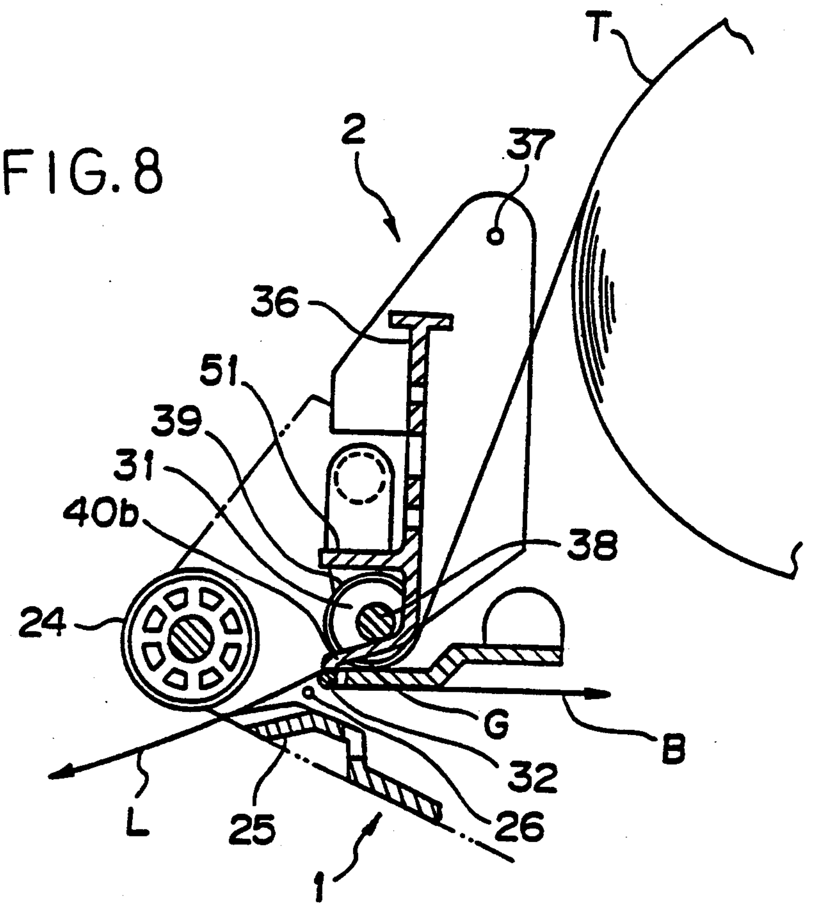
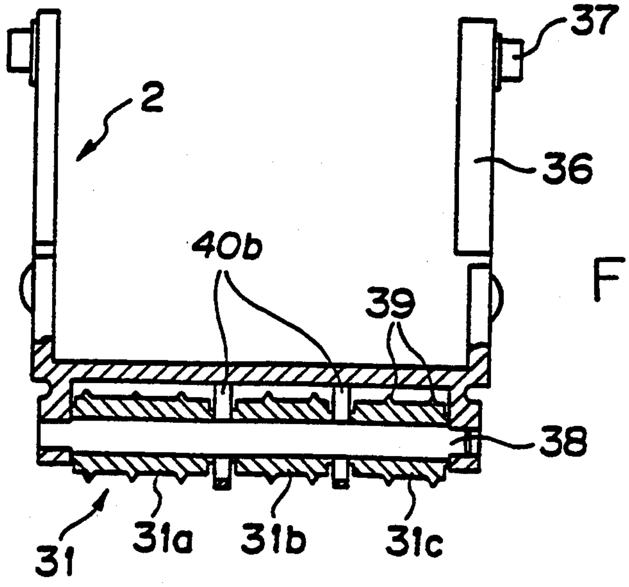
FIG. 9

LABEL FEED PITCH CHANGE-OVER MECHANISM FOR LABELER

BACKGROUND OF THE INVENTION

1. Field of the Invention

This invention relates to a label feed pitch change-over mechanism for a labeler which can be loaded with label cassettes having different length label rolls.

2. Description of the Prior Art

As prior art technology falling into this category, Japanese Utility Model Publication No. Hei 1(1989)-13,053 teaches a labeler equipped with a mechanism for changing the pitch at which labels are fed during label printing. In that mechanism, a vertical positioning means, there a screw, located at the upper part of the labeler is operated to raise or lower a vertically movable triangular adjustment member for adjusting the label feed stroke. The stroke adjustment is achieved by controlling the relationship between a vertical positioning plate having an inclined surface and a link shaft attached to the drive member in order to limit the rotational angle of the drive member and thus change the stroke of a reciprocating feed member.

The mechanism for adjusting the stroke of the feed member during label feeding in this prior art labeler is both complex in structure and troublesome to adjust before operating. Moreover, since the stroke adjustment it provides during label feeding is conducted steplessly, in fine degrees, the mechanism appears to be intended for adjusting the labeler to compensate for errors in the positioning of feed cuts in the label backing sheet that occur during production of the label roll.

SUMMARY OF THE INVENTION

The present invention was developed in light of the foregoing problems. Its object is to provide a label feed pitch change-over mechanism for a labeler which is able to change the feed pitch of a roll type continuous label strip as required in response to large changes in label size, particularly length changes, between different continuous label strips, which is simple in structure and easy to operate, and which provides stepwise pitch change-over in two or more steps rather than continuous pitch change.

For achieving this object, the present invention provides a label feed pitch change-over mechanism for a labeler comprising stops which can be slid in the longitudinal direction of the bottom member of the labeler by operation of a movable change-over member, such sliding motion brings the stops into and out of engagement with the cams of gears which operate a claw reciprocator to draw a backing strip so that labels temporarily attached to the backing strip are peeled off by sharply reversing the direction of travel of the backing strip. The claw reciprocator is changed between long and short reciprocating strokes respectively by the disengagement and engagement of the stops from and with the cams.

When the label feed pitch is changed from long to short, the change-over mechanism is adjusted. Starting from the long label feed pitch state, the operating lever is squeezed. During that squeezing, the change-over member is slid toward the rear of the labeler. This causes an engagement projection, which is attached to the stops that interfit with the cams, to ride over a stationary obstruction in the form of a step and this moves the cam stops into engagement with the cams which inhibits fullest outward swinging of the hand grip, reduces the stroke of the slide member and establishes the short label feed pitch.

Other features and advantages of the present invention will become apparent from the following description of the invention which refers to the accompanying drawings.

BRIEF DESCRIPTION OF THE DRAWINGS

FIG. 8 is a side sectional view of the essential part of another embodiment of an excessive label projection prevention device employing an elastic label presser member.

FIG. 9 is a top sectional view of the device of FIG. 8.

DETAILED DESCRIPTION OF THE PREFERRED EMBODIMENT

Figure 1:
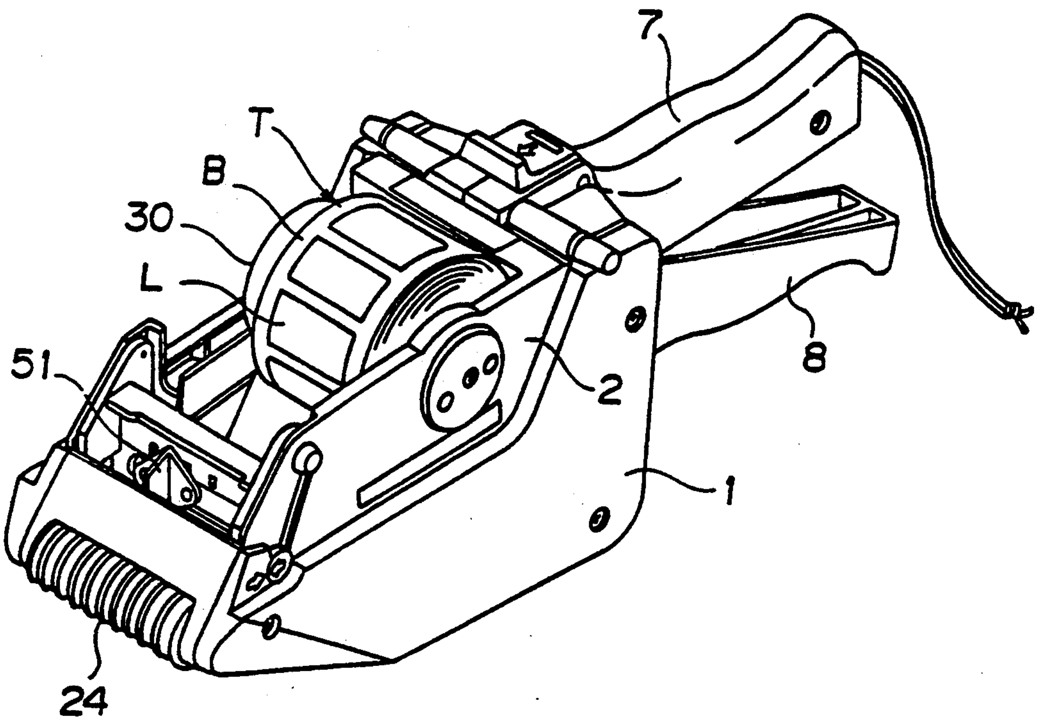
FIG. 1 is an overall perspective view of a labeler unit equipped with the label feed pitch change-over mechanism according to this invention and loaded with a label cassette containing a roll of continuous label strip.

A labeler equipped with a mechanism for label feed pitch change-over according to the invention is generally described with reference to FIGS. 1 to 3. As shown in the overall perspective views of FIGS. 1 and 2, the labeler is comprised of a labeler unit 1 and a label cassette 2 loaded into the labeler unit 1. The label cassette 2 comprises a spool 30 for holding a roll of a continuous label strip T consisting of a number of preprinted labels L separably attached at regular intervals to a backing strip B. When an operating lever 8 of the labeler unit 1 is squeezed toward the grip 7, one of the labels L is peeled off the backing strip B and made ready for attachment to the object to be labeled.

The roll of continuous label strip T is available in different types in which the labels L temporarily attached to the backing strip B are of different length. The labeler unit 1 is provided with the label feed pitch change-over mechanism according to the present invention so as to be able to use the different types of continuous label strip T. When the continuous label strip T is changed from one type to another, the label feed pitch change-over mechanism is operated to change the label feed pitch to a distance suitable for the pitch of the labels of the new continuous label strip T.

Figure 3:
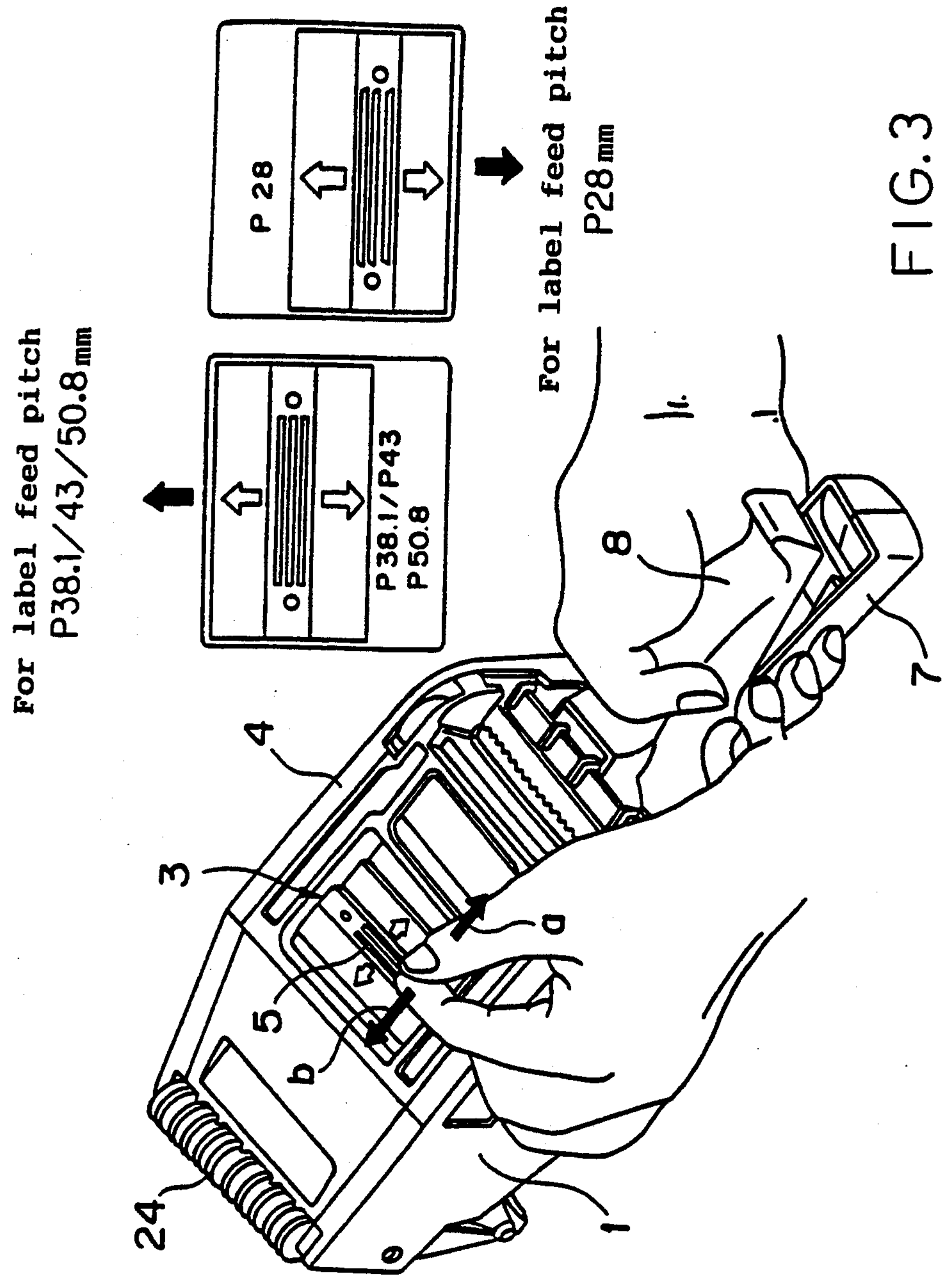
FIG. 3 is a perspective bottom view of the labeler unit of FIG. 1 showing the operation for changing the label feed pitch.

As shown in the perspective view of FIG. 3, the change-over between different length label feed pitches is carried out by operating a pitch change-over section 3, specifically by sliding a change-over member 5 thereof provided on a bottom member 4. In the illustrated embodiment, two label feed pitch settings are possible. When the change-over member 5 is slid in the direction of arrow a, the shorter feed pitch setting (28 mm) is selected, and when the member 5 is slid in the direction of arrow b, the longer pitch setting (38.1 mm, 43 mm, 50.8 mm) is selected. (The reason for the longer setting is to be able to provide three pitches as explained later.)

Figure 4:
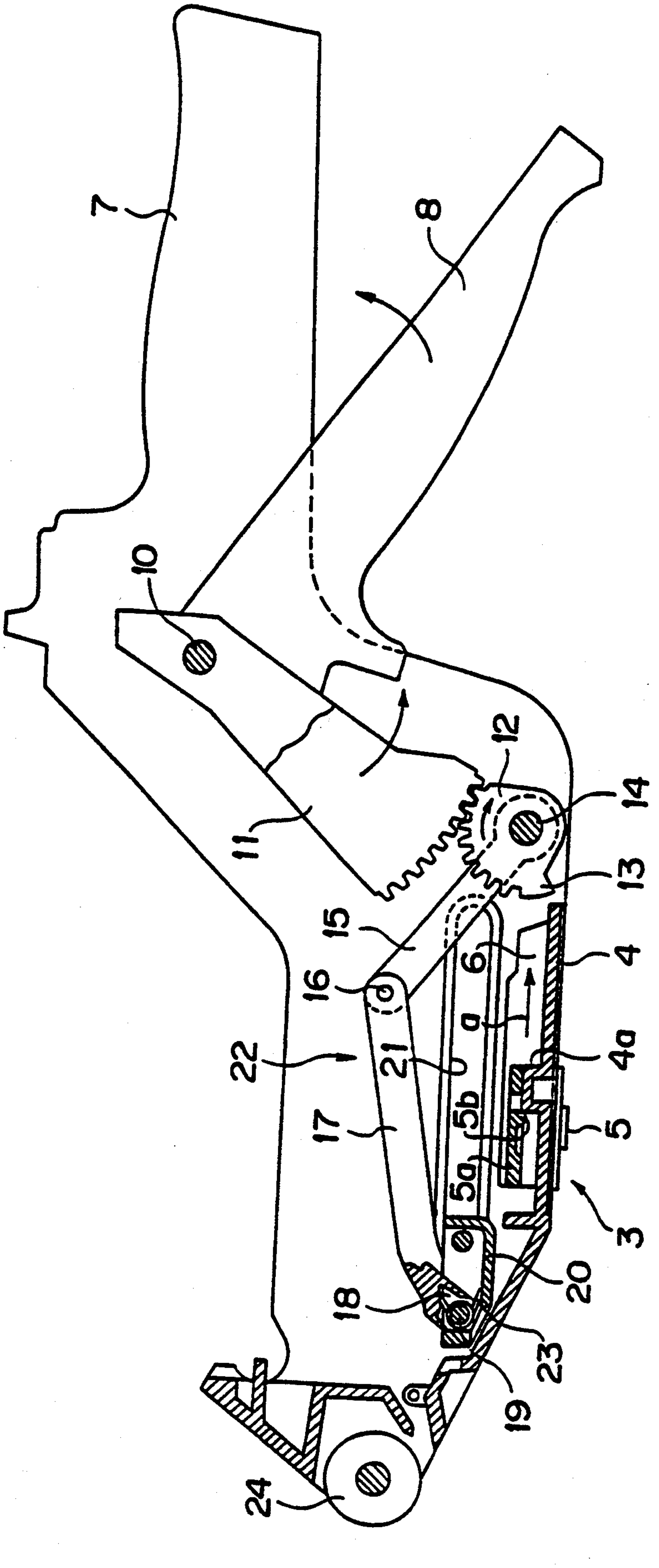
FIG. 4 is a simplified overall side sectional view of the labeler unit of FIG. 1 showing the label feed pitch change-over mechanism before label feed pitch change-over.
Figure 5:
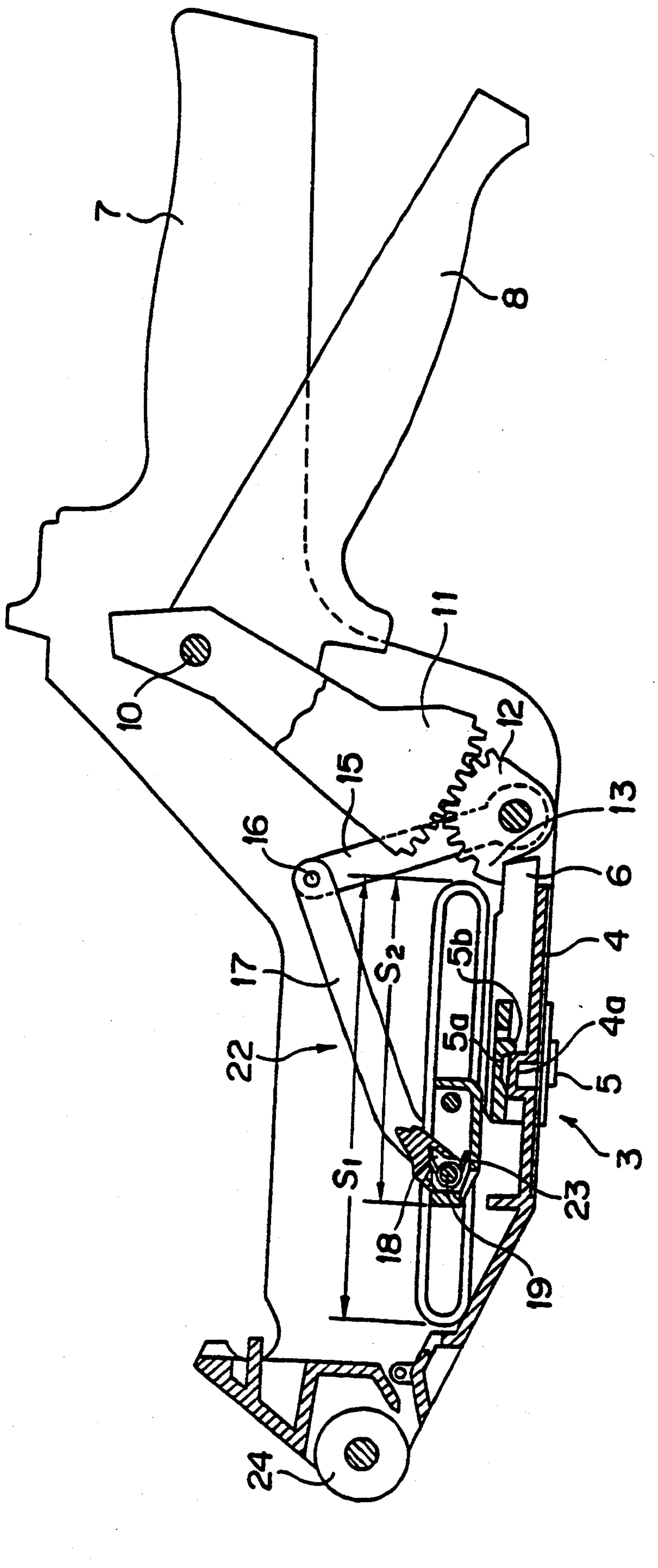
FIG. 5 is a simplified overall side sectional view of the labeler unit of FIG. 1 showing the label feed pitch change-over mechanism after label feed pitch change-over.

The label feed pitch change-over mechanism is explained with reference to FIGS. 4 and 5. The pitch change-over section 3 is provided at the bottom member 4 of the labeler unit 1 and achieves label feed pitch change-over by riding over a stationary step 4*a* extending in the lateral direction of the bottom member 4. The pitch change-over section 3 comprises the change-over member 5, which is a molded cylinder of synthetic resin having an engagement section 5*a* including an elastic engagement projection 5*b* on its bottom side. Pitch change-over is achieved by the engagement projection 5*b* riding over the step 4*a*.

A stop 6 is bonded to or formed integrally with either lateral side of the change-over member 5. The pair of stops 6 move together with the change-over member 5 to be slidable in the longitudinal direction of the bottom member 4, namely in the longitudinal direction of the backing strip B.

A sector gear 12 has a cam 13 formed at one location around the gear 12 and the cam is engageable with one of the stops 6. The gear 12 is rotatably mounted on either end or there is a gear on both ends of a shaft 14 and supported by the opposite lateral walls of the labeler unit 1. Each sector gear 12 is also engaged with the gear portion of one of a pair of geared arms 11. The geared arms 11 are rotatably mounted on a shaft 10 and are rigidly connected with the operating lever 8 so that the arms 11 are rotated counterclockwise against the force of a spring 9 (see FIG. 6) when the operating lever 8 is gripped. This in turn rotates the gear 12 clockwise when the lever is gripped. The cams 13 are then lifted, to be spaced above the stops 6 and their spacing above the stops is related to the pitch of the labels then being dispensed.

An operating arm 15 is mounted on either end of the shaft 14 outwardly of the sector gear 12 mounted thereon. The other end of each operating arm 15 is linked with a claw arm 17 via a link pin 16. The other end of the claw arm 17 is rotatably attached to a shaft 19 of a slider 20. The movement of the operating arm 15 is thus transmitted to the slider 20 to cause the shaft 19 of the slider 20 to slide along a guide rail 21 which extends in the longitudinal direction of the bottom member 4. The shaft 19 of the slider 20 has a pair of claws 18 which engage with and pull feed flaps (not shown) of the backing strip B. The operating arm 15, claw arm 17, slider 20 and claw 18 on each side together constitute a claw reciprocator 22.

Figure 6:
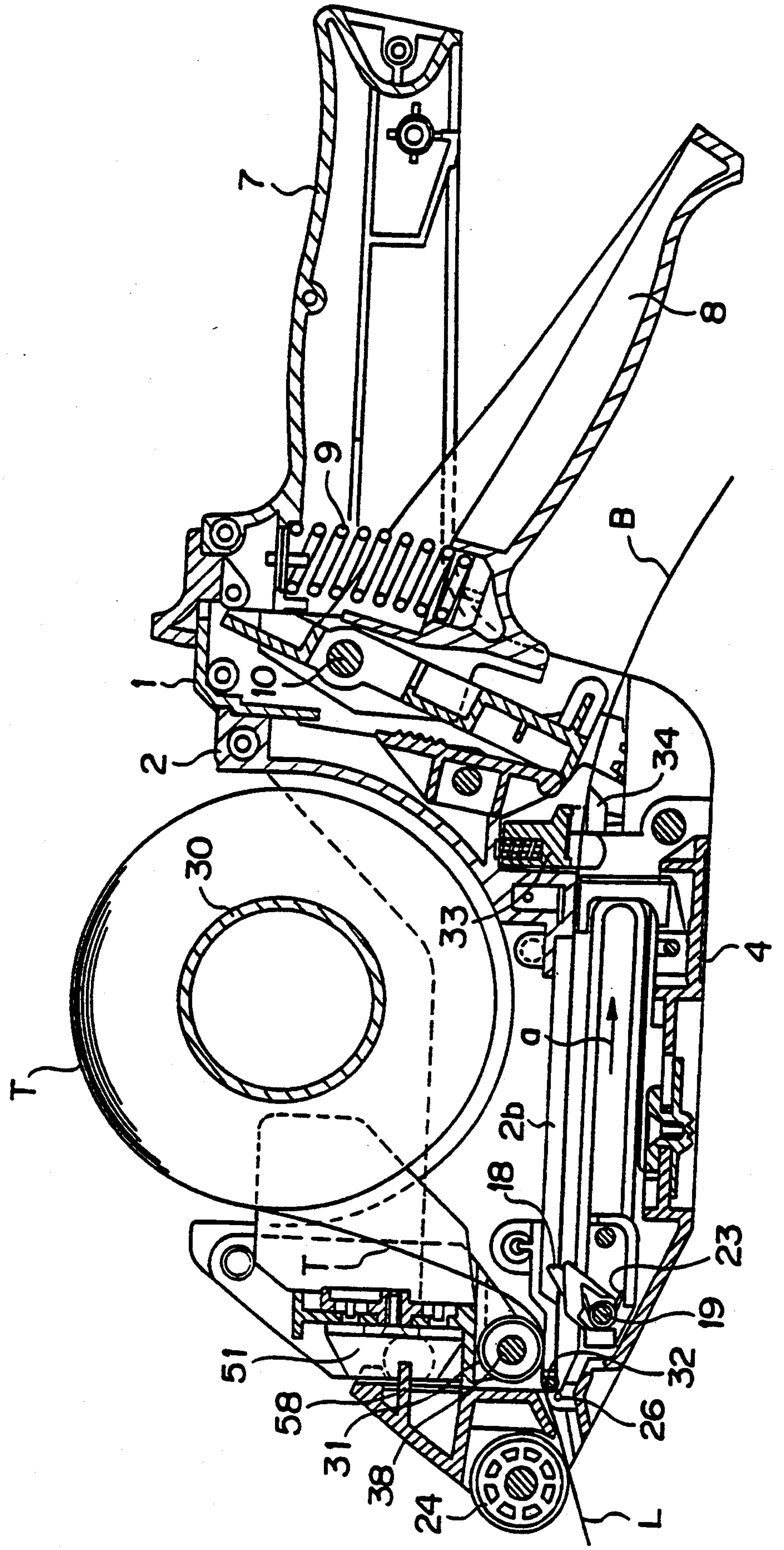
FIG. 6 is an overall side sectional view of the labeler unit of FIG. 1 with the label cassette loaded and the continuous label strip set in place for printing.

FIG. 6 shows a side sectional view of the labeler unit loaded with a label cassette 2 having a roll of continuous label strip T on its spool 30.

The tip of the continuous label strip T is paid out from the label cassette 2 and passed under a presser roller 31 and to a deflection pin 32 provided in the label cassette 2, where the backing strip B is turned sharply back for peeling off the labels L. On the other hand, as mentioned earlier, the backing strip B from which the labels L have been peeled is drawn in the direction of the arrow a by the claws 18. As will be explained later, on the return stroke the claws 18 disengage from the backing strip B and move in the opposite direction from the arrow a to resume their initial positions.

The reciprocal motion of the claws 18 is produced via the geared arms 11, the sector gears 12 and the claw reciprocator 22 through an operator squeezing the operating lever 8 toward the grip 7 against the force of the spring 9 and by the operator thereafter releasing the operating lever 8 to allow the spring 9 to return it to its normal position.

Each claw 18 is further biased by a coil spring 23 wound about the shaft 19. Thus, after the claws have engaged with the feed flaps of the backing strip B and drawn the backing strip B a prescribed distance (the label feed pitch) toward the rear or handle end of the labeler, the action of the coil springs 23 enables the claws 18 to disengage from the feed flaps and, while maintaining a light pressure on the undersurface of the backing strip B, to return to their original positions for engagement with the next pair of feed flaps.

The reasons why three pitches (38.1 mm, 43 mm, 50.8 mm) can be obtained at the longer setting is that when the pitch of the feed flaps is short, the claws 18 subject to pressure contact by the coil springs 23 slip until they engage with feed flap portions. On the other hand, on the return stroke, the claws 18 overcome the force of the coil springs 23 to separate from the feed flaps of the backing strip B.

Although in the present embodiment the gears 12 provided with cams 13 for engaging/disengaging with/from the stops 6 are sector shaped, it is alternatively possible to use circular gears, provided that they are formed at an appropriate portion thereof with cams like 13 for engaging/disengaging with/from the stops 6. It is also possible to form the cams 13 on the side surfaces of the gears 12 or to form them independently of the gears 12.

In addition, label feed pitch change-over mechanisms with strokes suitable for use with continuous label strips T of various label pitches can be made available by equipping them with cams 13 of differing circumferential thickness.

The operation of the label feed pitch change-over mechanism according to the present invention is explained with reference to FIGS. 4 and 5. When it is desired to change-over from the long pitch setting (FIG. 4) to the short pitch setting (FIG. 5), the change-over member 5 is slid from the position shown in FIG. 4 in the direction of the arrow a so as to cause the engagement projection 5*b* to ride over the step 4*a* and assume the position shown in FIG. 5. When the change-over member 5 is slid in this manner, the stops 6 also move by the same distance in the direction of the arrow a and, as a result, come into engagement with the cams 13 of the sector gears 12.

This engagement of the stops 6 with the cams 13 requires the operating lever 8 to be squeezed slightly.

This is to counter the force of the spring 9 which acts to rotate the sector gears 12 counterclockwise and hold the cams 13 at a level where they will be struck by the stops 6 when the stops are slid in the direction of the arrow a. The operating lever 8 is therefore squeezed to rotate the cams 13 of the sector gears 12 by a small amount, specifically to a position raised above the stops 6, after which the stops 6 can pass under the cams 13 and engage them. The operating lever 8 can then be released.

The engagement of the stops 6 and the cams 13 of the sector gears 12 reduces the rotation of the gears 12 by the thickness of the cams 13 and thereby shortens the stroke of the claw reciprocator 22 from S1 to S2 so that the claws 18 thereafter reciprocate for drawing the backing strip B at a shorter stroke S2.

The operation for changing the label feed pitch from short to long, which is the reverse of that just explained, increases the stroke of the claw reciprocator 22 from S2 to S1, whereafter the claws 18 reciprocate for drawing the backing strip B at a longer stroke S1.

There is a guide surface **2*b* for the backing strip B of the label cassette 2 which corresponds to the bottom of the cassette. A backing sheet presser foot 33 presses down on that sheet. A cutter 34** severs the backing strip B into appropriate lengths.

In the label feed pitch change-over mechanism according to this invention, the labeler unit 1 is equipped on both sides with the sector gears 12, the cams 13, the claw reciprocator 22 and the stops 6 engageable with the cams 13. This is different from the one-sided arrangement of the prior art labeler (Japanese Utility Model Publication No. Hei 1(1989)-13,053), so that this two-sided arrangement eliminates label feed position shift and ensures stable label conveyance.

Another aspect of this invention provides an excessive label projection prevention device for preventing excessive projection of the continuous label strip T.

In the labeler to which this invention is applied, the labels L separably attached to the backing strip B are peeled off the backing strip B and made ready for application to the object to be labeled by sharply reversing the direction of travel of the backing strip B. The label excessive projection prevention device according to the invention prevents the peeled off labels from being projected further than the prescribed amount from a labeling roller 24 at the label supply port at the front of the labeler.

The label excessive projection prevention device is shown in FIG. 2 and FIGS. 6 to 9. It is an improvement of the presser roller 31 portion located at the forward end of the label cassette 2 (FIG. 6) for holding down the paid out continuous label strip T. It is explained mainly with reference to the embodiment shown in FIG. 7.

The label cassette 2 is equipped with a rotary label presser section 36 for holding down the continuous label strip T. The rotary label presser section 36 comprises a pair of support projections 37 that are pivotably supported by the opposite side walls **2*a* of the label cassette 2 so as to accommodate the rotary label presser section 36 inside the label cassette 2**.

Figure 7:
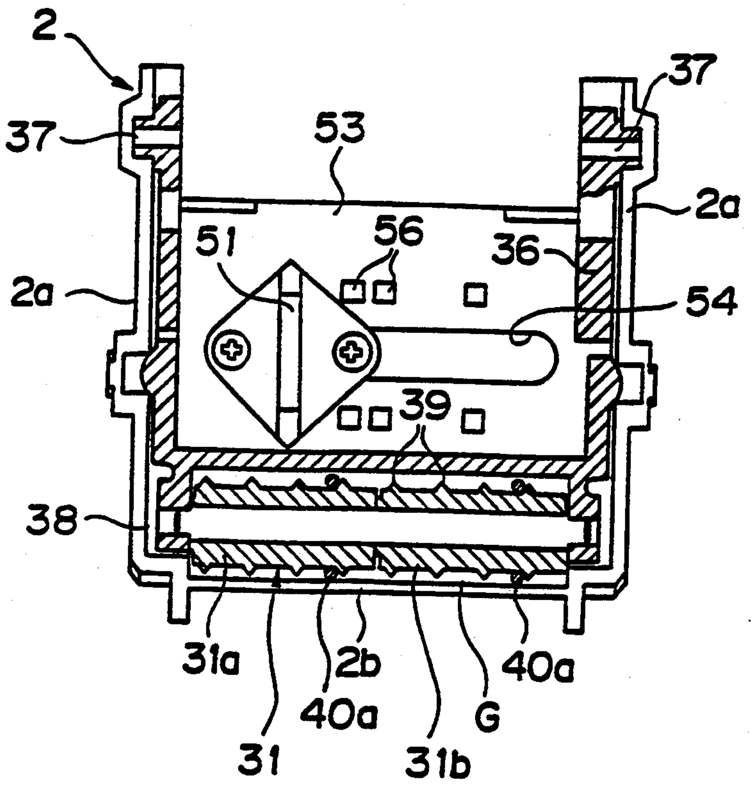
FIG. 7 is a front sectional view of the essential part of an embodiment of an excessive label projection prevention device employing a rubber ring.

More specifically, as shown in FIGS. 6 and 7, the leading end of the roll of continuous label strip T is drawn out and, with the rotary label presser section 36 opened upward, turned back at the deflection pin 32 and set in a rotary backing sheet presser section at the rear of the label cassette 2.

The presser roller 31 for guiding the continuous label strip T is provided at the forward end of the rotary label presser section 36. The rotary label presser section 36 is preferably divided into a plurality of sections so as to be able to cope with labels of different width and configuration. In the illustrated embodiment, it is divided into two roller sections **31*a* and 31*b***.

The presser roller 31 is mounted on a roller shaft 38 and is provided on its periphery with a large number of peripheral projections 39 for promoting smooth guidance of the continuous label strip T. A plurality of rubber rings **40*a* which serve as excessive label projection prevention members, are fit over the presser roller 31 at positions between the peripheral projections 39**.

The rubber rings **40*a* provided on the periphery of the presser roller 31 elastically retain the continuous label strip T as it passes through the narrow gap G between the presser roller 31 and the bottom 2*b* of the label cassette 2**. The peeled off labels L are thus prevented from projecting more than the prescribed amount.

A second embodiment of the excessive label projection prevention device is explained with reference to FIGS. 8 and 9. In the second embodiment, the roller shaft 38 at the forward end of the rotary label presser section 36 of the label cassette 2 is fitted with a presser roller 31 consisting of three roller sections **31*a*, 31*b*, 31*c* and elastic label presser members 40*b* made of synthetic resin and formed integrally with the rotary label presser section 36 are located between adjacent roller sections 31*a* and 31*b* and between sections 31*b* and 31*c***.

The elastic label presser members **40*b* serving as the excessive label projection prevention members apply an elastic force on the deflection pin 32 located at the bottom front of the label cassette 2** and this force prevents the labels L peeled off the backing strip B and projected forward from being projected more than the prescribed amount.

The labeler unit 1 is provided with a label receiver 25 for receiving the peeled off labels L, has an auxiliary pin 26 for guiding the peeled off labels L, and includes the labeling roller 24 for applying the labels L to the individuals objects to be labeled.

Another aspect of this invention provides a retainer for restricting lateral movement of the roll of continuous label strip. This retainer is an improvement on the label lateral guide device for a label cassette disclosed in the assignee's Japanese Laid-Open Patent No. Hei 2(1990)-4630. The retainer ensures that the continuous label strip can be paid out smoothly irrespective of differences in width between different types of label strip rolls.

The retainer is shown in FIGS. 2, 6 to 10, and 12.

Figure 2:
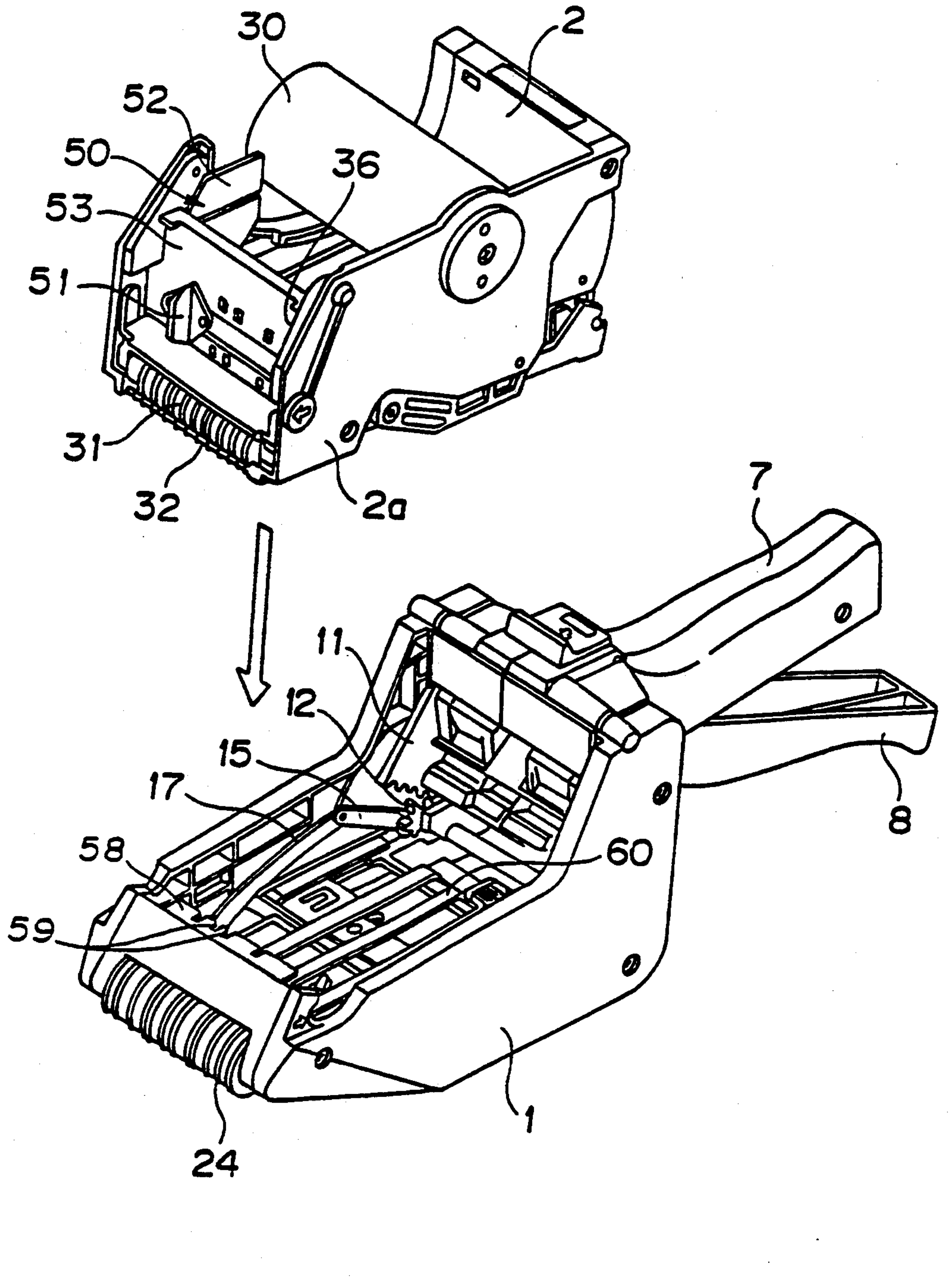
FIG. 2 is a perspective view of the labeler unit of FIG. 1 showing the labeler unit and the label cassette in their separated state.
Figure 10:
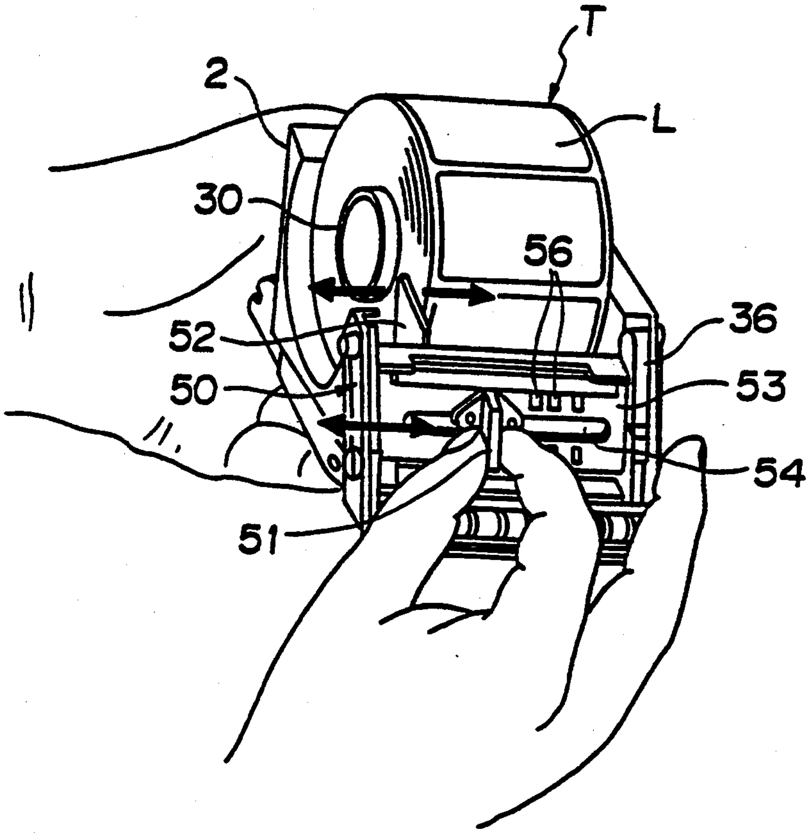
FIG. 10 is an overall perspective view of the label cassette of the labeler of FIG. 1 showing how a retainer for restricting lateral movement of the roll of the continuous label strip is operated.

Referring first to FIGS. 2 and 10 showing perspective views of the label cassette 2, the label cassette 2 is provided at its forward end with a label lateral restriction section 50 which comprises a retainer plate 52 linked with a grip 51 slidable along a guide slit 54 in a front dial face 53 of the rotary label presser section 36 for restraining the side surface of the roll of continuous label strip T.

Figure 11:
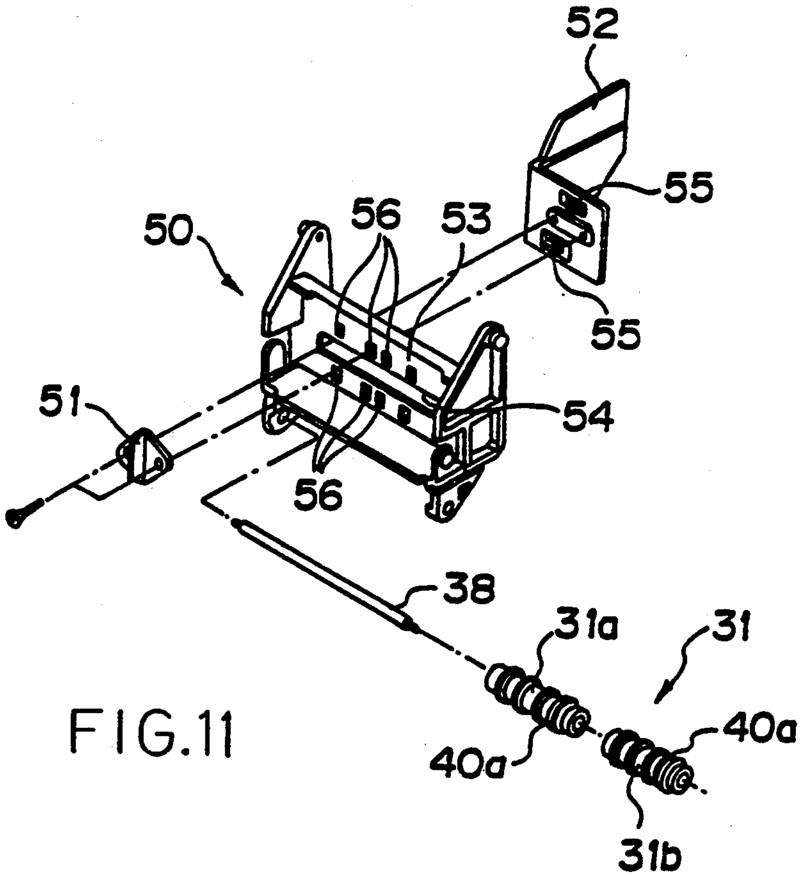
FIG. 11 is an exploded perspective view of a part of the retainer of FIG. 10.
Figure 12:
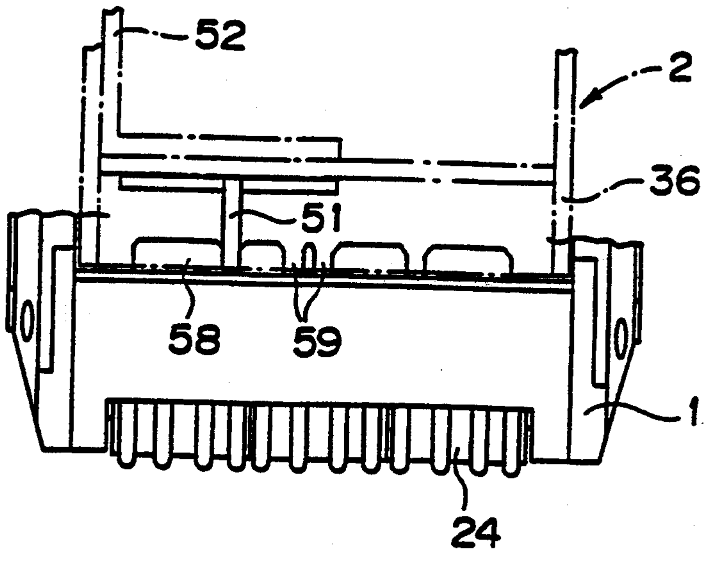
FIG. 12 is an enlarged plan view of the essential part of the retainer of FIG. 10.

As shown in FIG. 11, the grip 51 in front of the face 53 and the retainer plate 52 behind that face are held in a selected position by engagement of elastic projections 55 on the retainer plate 52 with one of a plurality of pairs of engagement holes 56.

The retainer plate 52 and the elastic projections 55 thereon are integrally molded of synthetic resin. Three pairs of engagement holes 56 are provided, one each for restricting 48 mm, 40 mm and 36 mm wide rolls. The members of each pair are vertically aligned above and below the guide slit 54.

As described in the foregoing, the label feed pitch change-over mechanism for a labeler according to the present invention is constituted such that by operating the change-over member 5 of the pitch change-over section 3 at the bottom of the labeler unit 1 so as to cause the longitudinally slidable stops 6 to engage/disengage with/from the cams 13 of the sector gears 12 linked with the reciprocating claw reciprocator 22, the total stroke of the claw reciprocator 22 can be controlled for simply and accurately changing the label feed pitch.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A label feed pitch change-over mechanism for a labeler, comprising:

a labeler body; a label strip holder supported on the body for supplying a label strip to the labeler body, wherein the label strip includes a backing strip;

a reciprocator on the labeler body for reciprocating in a first stroke direction along the body to engage the backing strip and draw the backing strip along the body to draw the label strip from the holder and for reciprocating in a second stroke direction with respect to the backing strip;

means on the labeler for separating labels from the backing strip and projecting the labels as the reciprocator moves in the first and second direction to move the backing strip;

operating means on the labeler for operating the reciprocator in the second direction to position the reciprocator for engaging the backing strip so that the reciprocator may thereafter move the backing strip in the first direction; the operating means comprising a gear drivingly connected with the reciprocator and means for operating the gear to cause the reciprocator to reciprocate in the first and second directions;

label pitch change-over means including a stop thereon, the label pitch change-over means being moveable between a blocking position with the stop thereof at a position to block movement of the gear in the first direction beyond a first amount, thereby to shorten the label feed pitch of the reciprocator due to engagement of the gear with the stop, and an unblocking position with the stop out of position to block movement of the gear for enabling the label feed pitch reciprocator to move in the first direction over a longer distance for a longer label feed pitch.

2. The label feed pitch change-over mechanism of claim 1, wherein the label pitch change-over means comprises a rotatable gear rotatably mounted to the labeler;

the operating means for the reciprocator comprises a grip on the labeler in engagement with the gear such that squeezing of the grip rotates the gear to move the reciprocator in the first direction and such that release of the grip permits the reciprocator to move in the second direction.

3. The label feed pitch change-over mechanism of claim 2, wherein the gear is a rotatable gear supported on a rotation axis on the labeler, a cam on the gear rotates with the gear, and the stop is moveable into a position to block the rotation of the cam and thereby of the gear beyond the extent of rotation of the gear needed to move the reciprocator in the first direction over a shorter distance for a shorter label feed pitch.

4. The label feed pitch change-over mechanism of claim 2, further comprising means for guiding the reciprocator to slide along the labeler body as the gear is moved for moving the reciprocator in the first and second directions along the guide path defined by the guide means.

* * * * *